May 26, 1942.  F. KRUEGER  2,284,286
CONTAINER HANDLING APPARATUS
Filed Aug. 8, 1939  2 Sheets-Sheet 1
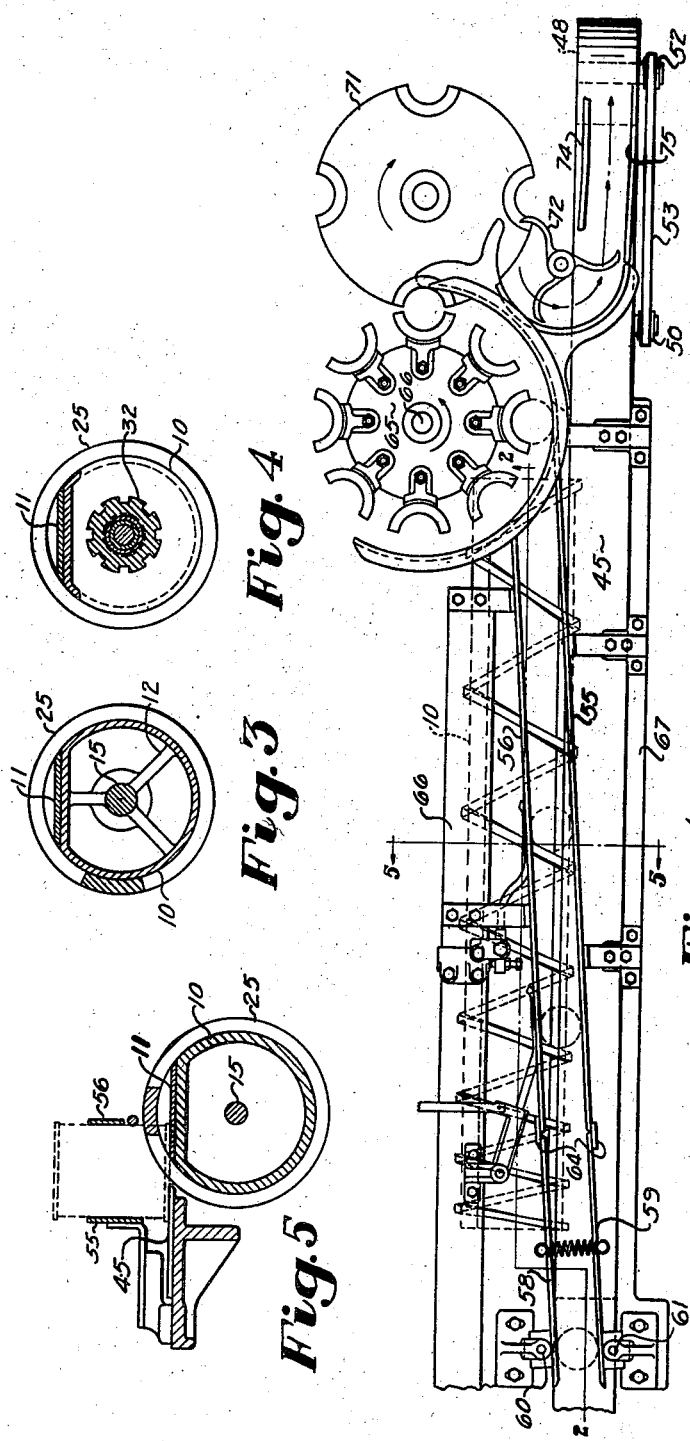
INVENTOR.
FRANK KRUEGER
Horace B. Fay
ATTORNEY.

May 26, 1942.  F. KRUEGER  2,284,286
CONTAINER HANDLING APPARATUS
Filed Aug. 8, 1939  2 Sheets-Sheet 2
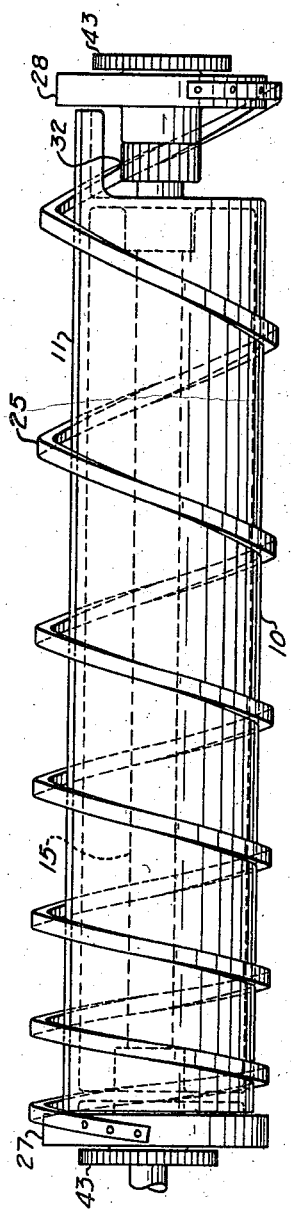
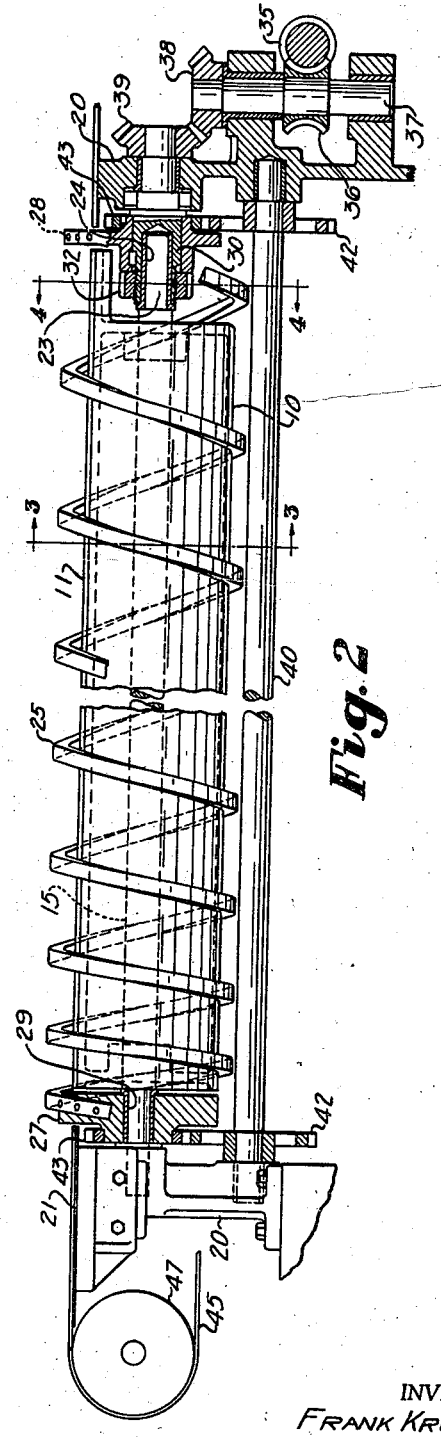
INVENTOR.
FRANK KRUEGER
Horace B. Jay
ATTORNEY.

Patented May 26, 1942

2,284,286

UNITED STATES PATENT OFFICE 2,284,286

CONTAINER HANDLING APPARATUS

Frank Krueger, Brooklyn, N. Y., assignor to E. W. Bliss Company, Brooklyn, N. Y., a corporation of Delaware Application August 8, 1939, Serial No. 288,977

9 Claims. (Cl. 198—22)

This invention relates to apparatus for feeding containers, as tin cans and the like, from one fabricating operation to another. It is particularly directed to the feeding of filled cans into the can head seaming mechanism by which the top is affixed to the can.

Feeding equipment as outlined above has generally consisted of a rotating sleeve on which was formed a spiral and which was mounted so that the spiral portion engaged a part of the container bodies and fed them along a track as the spiral and its supporting cylinder were rotated.

This construction is open to several disadvantages, the first of which is that the can was not engaged by an appreciable part of the spiral and was liable to be overturned. Similarly, the can was not engaged over a sufficient distance to reduce to a satisfactory minimum the tendency of the spiral to push the can out of the line of feed. Such units were expensive to construct and were open to other objections in addition to those set out.

My invention employs the principle of a feeding table which may partially or entirely support the container, together with a spiral feeding screw rotatably mounted about said table. Additional support for the containers is obtained by a feed belt lying parallel with the table and adapted to cooperate therewith in supporting the bottom of the cans. The spiral rotates through the spaced opening between the table and the belt.

I have found that by employing a belt of considerable length and mounting the seam head or other fabricating mechanism adjacent its midsection I can not only use the belt to feed containers to the station, but can also use the belt to transfer containers from the station to some other part of the can line.

The general object of my invention has been to provide a simplified construction which, in addition to the features outlined above, provides for easy and rapid handling of container bodies. Still another object has been to provide a spiral feed screw in which the convolutions are spaced from each other an increasing distance in order that the travel of the containers therealong may be accelerated and in order that different sizes of containers may be easily accommodated.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting however, but one of various mechanical means in which the principle of the invention may be used.

In said annexed drawings:

Fig. 1 is a plan view of my complete can handling assembly;

Fig. 2 is a vertical section therethrough as indicated by the line 2—2 of Fig. 1;

Figs. 3 and 4 are sections through Fig. 2, as indicated by the lines 3—3 and 4—4 thereon;

Fig. 5 is a section through Fig. 1 as indicated by the line 5—5 thereon; and

Fig. 6 is a schematic view of the table and screw assembly.

Referring now to Figs. 1 and 2, I provide a generally cylindrical element 10 which is flattened on its top and carries a wear-receiving plate 11 to form the container table aforementioned. The element 10 is provided with ribs 12, which in turn receives a supporting bar 15 carried at the left-hand end (Fig. 2) in the main frame 20. An auxiliary table 21 is carried by the frame 20 and cooperates with the table 11 in handling containers.

The right-hand end (Fig. 2) of the table bar 15 is received at 23 in a rotating bearing 24, which rotating unit acts as hereafter described to drive the spiral member.

The spiral itself, indicated at 25, consists of a long rod of square cross-section formed into the helix shown in Fig. 6. It will be noticed that the convolutions adjacent the left-hand end of that figure are spaced closer to each other than adjacent the right-hand end. This is to provide an accelerating rate of speed for containers therealong and also acts to accommodate different sizes of containers, as hereafter described.

The spiral is supported at each end by hubs 27 and 28 to which it is rigidly bolted and which are rotatably mounted on bearings 29 and 24 respectively. The hub 28 is keyed to a sleeve 30 which receives the portion 23 of the bar 15 and is separated therefrom by the bearing 24. The sleeve 30 is in turn rotatably carried in the frame in suitable bearings.

To permit easy disassembly of the parts, the hub 28 is slid over sleeve 30 and keyed thereto. It is then locked against a shoulder of the sleeve by a lock nut 32 threadingly carried by said sleeve.

The spiral is driven from a worm gear 35 and pinion 36 which latter is carried by a stub shaft 37. The shaft carries a bevel gear 38 meshing with a gear 39 mounted on a shaft 26 rotatable with sleeve 30.

Both ends of the spiral are driven. The left-hand end (Fig. 2) is driven from a shaft 40 carrying gears 42 meshing with gears 43 carried by respective hubs 27 and 28. As the hub 28 is driven it drives the shaft 40 and this in turn drives the left-hand end of the spiral and its hub 27. Perfect alignment is thus maintained between both ends of the spiral member as it rotates about the table 11.

A continuous belt 45, preferably of steel, extends from one end of the equipment to the other and is received over a pair of pulleys 47 and 48. The belt is driven from a sprocket wheel 50 mounted for rotation in synchronism with the spiral driving mechanism. The sprocket 50 drives a sprocket 52 carried on the shaft of the pulley 48 through a chain 53.

Containers are fed onto the left hand end of the conveyor 45, as viewed in Fig. 1, and by it are carried into a path defined by guide rails 55 and 56, mounted at a slight angle to the axis of the spiral member, as shown in Fig. 1. These rails act to guide containers off of the belt 45 onto the table 11 from which they are removed by a dial, hereafter described.

To allow for complete registration of the succeeding containers with the convolutions of the spiral, two sections of the rails 55 and 56 are formed as at 58 and 59. These short sections are pivoted at 60 and 61 to the machine frame and are movable at all times in parallel relationship.

If cans enter between the rails 58 and 59 and do not immediately register between the convolutions of the spiral, these sections of the rails may pivot outwardly away from the spiral about their pivots until such time as the rotating spiral properly engages the container. A spring 62 returns the rails to the position of Fig. 1 as soon as this has taken place; the inward movement of the rails being limited by abutting sections 64.

After a container has been engaged by the spiral convolutions it is fed between the rails 55 and 56 as the spiral rotates until it is removed at the fabricating station by a dial 65 hereafter described.

Each of the rails 55 and 56 and the pivoted parts 58 and 59 are mounted on respective frames 66 and 67, which may be adjusted transversely of the spiral axis to increase the width of pass between the rails. In this manner containers of widely varying cross-sectional dimension may be handled by the same apparatus. Since the conveyor 45 will merely carry the container in the direction of feed until a pair of convolutions are encountered which are so spaced that the container may slip therebetween, it does not matter whether or not the containers are within reasonable limits even wider in diameter than corresponds to the width of belt 45.

Safety mechanism to prevent the feeding of containers or caps if a corresponding container or cap is missed, are provided, but are not here described as they are well known in the art to which this invention pertains.

A container body and top assembly station is provided at the end of the spiral and receives the containers as they pass between the rails 55 and 56 out of the influence of the spiral 25. This removal is effected by the dial 65 rotatably mounted at 66 to be driven in a counter-clockwise direction (Fig. 1). This dial picks up the containers and rotates them approximately 90° into a seaming head 71, where the can top and body are double-seamed together.

After the seaming operation the container is picked up by a feed-out dial 72 rotating in a counter-clockwise direction. The dials and seaming head just described are of a form well known in the art and hence are not described in detail here.

The containers are discharged from the feed-out dial 72 between a pair of rails 74 and 75 on to the conveyor 45, from which they were previously taken, and are by it carried to any further operating steps in the can line desired.

From the foregoing description it will be seen that I have provided an improved means for feeding containers from one operating station to another; in the improved mechanism the same conveyor is employed to transfer containers to a station and take them away from that station. I have also provided a novel and improved spiral feeding mechanism which is more simple and less expensive than those heretofore known and which possess marked feeding advantages.

Other modes of applying the principle of my invention may be employed instead of the one explained; change being made as regards the mechanism herein disclosed, provided the means stated by any of the following claims or the equivalent of such stated means be employed.

I therefore particularly point out and distinctly claim as my invention:

1. In container handling mechanism, a table to support said containers, a spiral member mounted for rotation about said table and adapted to feed containers along said table on rotation.

2. In container handling mechanism, a table to support said containers, a spiral member mounted for rotation about said table and with the convolutions thereof spaced from each other an increasing amount from one part thereof to another, and means to rotate said member about said table to feed containers along said table at a changing rate of speed dependent on the spacing of said spiral convolutions.

3. In container handling mechanism, a table to support a series of containers, a spiral member mounted for rotation about said table and adapted to feed containers along said table by rotation of the convolutions thereof in engagement with said containers, and a traveling feed belt to cooperate with said table in supporting said containers.

4. In container handling mechanism, a table to support a series of containers, a spiral member mounted for rotation about said table and adapted to feed containers along said table by rotation of the convolutions thereof in engagement with said containers, and a yieldable guide rail to direct containers into the path of said convolutions and yieldable on engagement of said container by said convolutions other than between the convolution coils.

5. In container handling mechanism, a table to support a series of containers, a spiral member mounted for rotation about said table and adapted to feed containers along said table by rotation of the convolutions thereof in engagement with said containers, and a rotating dial at one end of said spiral and adapted to remove containers from the path of said spiral member and feed them away from said spiral.

6. In container handling mechanism, a table to support a series of containers, a spiral member mounted for rotation about said table and adapted to feed containers along said table by rotation of the convolutions thereof in engagement with said containers, and an endless belt traveling in a direction parallel to the direction of feed of said spiral member to cooperate in feeding containers along said table.

7. In container handling mechanism, a table to support a series of containers, a spiral member mounted for rotation about said table and adapted to feed containers along said table by rotation of the convolutions thereof in engagement with said containers, a traveling feed belt to cooperate with said table in supporting said containers and a yieldable guide rail to direct containers into the path of said convolutions and yieldable on engagement of said container by said convolutions other than between the convolution coils.

8. In container handling mechanism, a table to support a series of containers, a spiral member mounted for rotation about said table and adapted to feed containers along said table by rotation of the convolutions thereof in engagement with said containers, a traveling feed belt to cooperate with said table in supporting said containers and a rotating dial at one end of said spiral and adapted to remove containers from the path of said spiral member and feed them away from said spiral.

9. In container handling mechanism, a table to support a series of containers, a spiral member mounted for rotation about said table and adapted to feed containers along said table by rotation of the convolutions thereof in engagement with said containers, a traveling feed belt to cooperate with said table in supporting said containers, a yieldable guide rail to direct containers into the path of said convolutions and yieldable on engagement of said container by said convolutions other than between the convolution coils, and a rotating dial at one end of said spiral and adapted to remove containers from the path of said spiral member and feed them away from said spiral.

FRANK KRUEGER.